June 8, 1965   B. D. CAVE ETAL   3,187,533
METAL-FORMING PRESS ADAPTED FOR MAKING HOLLOW
PASSAGEWAY PANELS
Original Filed Sept. 11, 1958   6 Sheets-Sheet 1

INVENTORS
BOYD D. CAVE
DIETRICH REIMANN
BY Glenn, Palmer & Matthews
ATTORNEYS

INVENTORS
BOYD D. CAVE
DIETRICH REIMANN

BY Glenn, Palmer & Matthews

ATTORNEYS

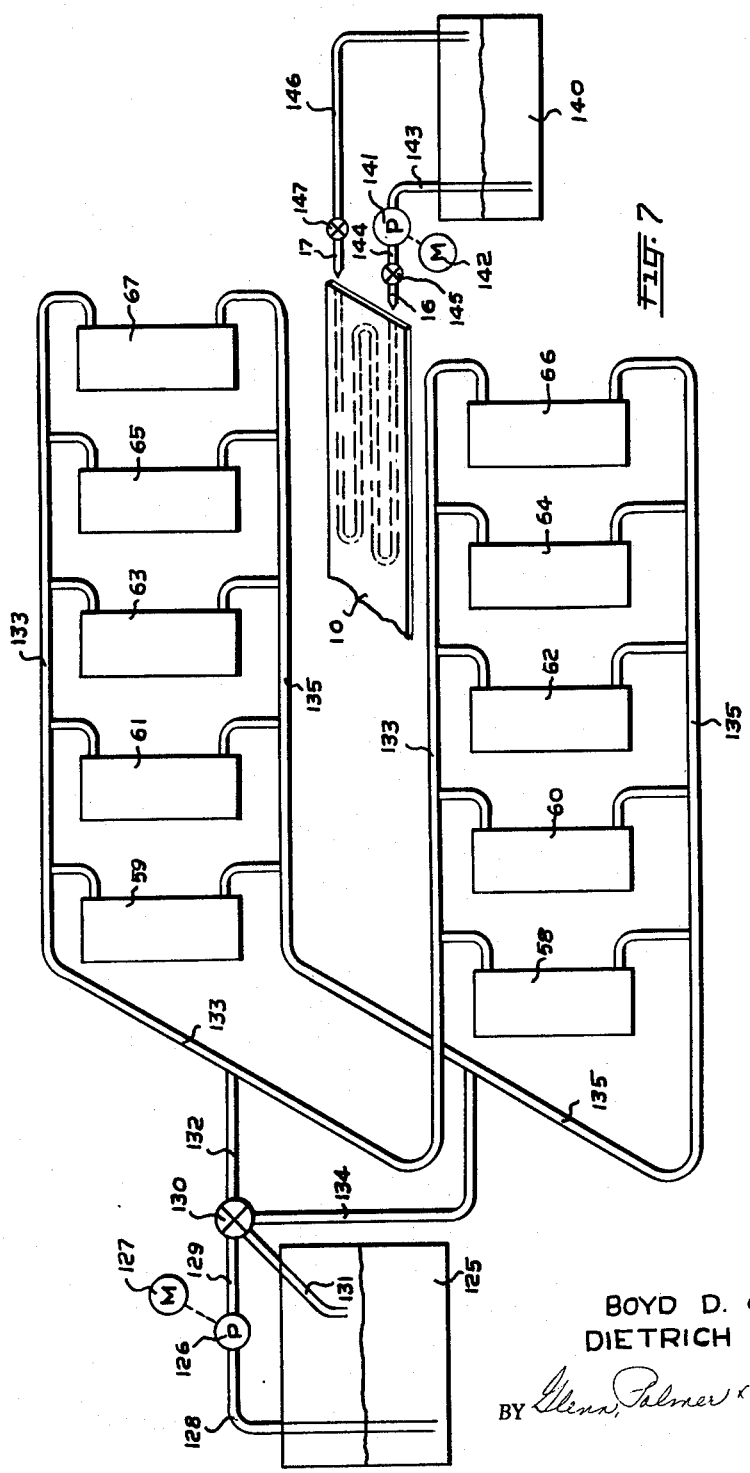

INVENTORS
BOYD D. CAVE
DIETRICH REIMANN
BY Glenn, Palmer + Matthews
ATTORNEYS

United States Patent Office 3,187,533
Patented June 8, 1965

3,187,533
METAL-FORMING PRESS ADAPTED FOR MAKING HOLLOW PASSAGEWAY PANELS
Boyd D. Cave, Tlalnepantla, Mexico, Mexico, and Dietrich Reimann, Barranquilla, Colombia, assignors to Reynolds Metals Company, Richmond, Va., a corporation of Delaware
Original application Sept. 11, 1958, Ser. No. 760,318, now Patent No. 3,092,898, dated June 11, 1963. Divided and this application Aug. 3, 1962, Ser. No. 224,880
8 Claims. (Cl. 72—61)

This application is a division of application Serial No. 760,318, filed September 11, 1958, now U.S. Patent 3,092,898, issued June 11, 1963.

This invention relates to the art of manufacturing hollow passageway panels and more particularly to an improved method for inflating such panels while confined in a press and to the inflating press used in such method.

As is known, panels of this type have wide-spread application in diverse usages wherein it is desired to pass a fluid through a passageway lying between the surfaces of a panel which generally is formed of metal, aluminum being an especially suitable metal for this purpose. The sheet forming the panel may be fabricated by any of several conventional processes wherein two flat portions of the sheet are bonded together to form an integral sheet except at a predetermined location where a passage is to be formed by subsequent internal application of a pressure fluid which bulges out one or both of the confronting sheet portions to form the passage space.

During the application of this expanding or inflating, pressure for the panel, the panel is confined in a press whose platens serve to resist, but to permit the bulging out of the panel surface to form the passageway, the platens being held apart at a fixed distance to provide a finished panel of predetermined dimensions. As an indication of the magnitude of the pressures required and of the concomitant size and cost of the press, such panels are often inflated under internal pressures of 3000 pounds per square inch. Moreover, the platens of the press may be as large as 3 feet by 10 feet with commensurate thickness as large as used, when the larger panels, such as used for the pressures used, when the larger panels, such as used for various heat exchangers are being fabricated.

Furthermore, since the passageway may, and generally does have a nonuniform configuration throughout the overall face of the panel, the resisting pressure which must be applied by the press platens is not uniform throughout the overall faces of the platens and a plurality of points of normal deflection of the platen faces from their proper spacing, are found. If this factor is not corrected, the press is subjected to heavy strain and the finished panel itself may not meet necessary tolerances as to passageway dimensions. In general, this factor has been compensated for by employing massive presses whose platens at all points are designed to resist the maximum inflating pressure which is to be expected and without significant deflection of those platens.

It is these and other disadvantages of the conventional practice of forming hollow passageway panels which our invention is intended to overcome.

An object of the invention is to provide an improved method for inflating hollow passageway panels in which smaller presses than those formerly employed for a given panel, may be used.

Another object is to provide an improved inflation press for use with hollow passageway panels.

Another object is to provide an improved inflation press for use with hollow passageway panels and in which the press platens are reinforced at points normally subject to significant deflection.

A further object is to provide an improved inflation press for use with hollow passageway panels and in which the press platens are prestressed before inflating pressure is applied to the panel.

Further objects and advantages will be apparent from the following description, reference being had to the accompanying drawings in which:

FIG. 7 is a schematic view of a hydraulic system for use in operating the press and for inflating the panel while confined in the press.

Figure 16:
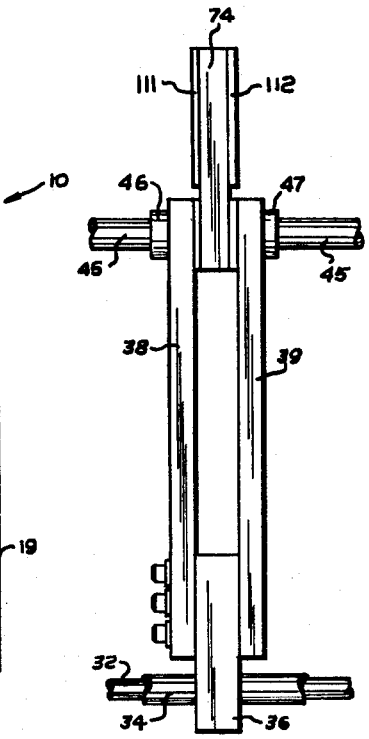
Figure 17:
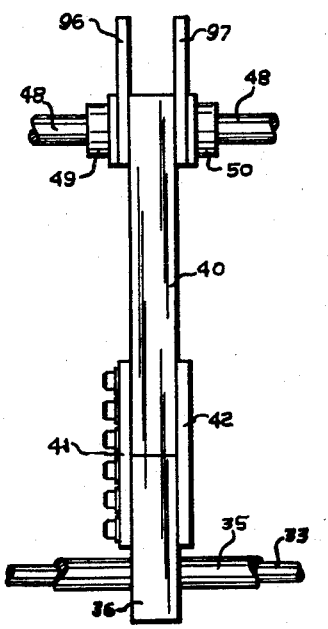
Figures 6, 8:
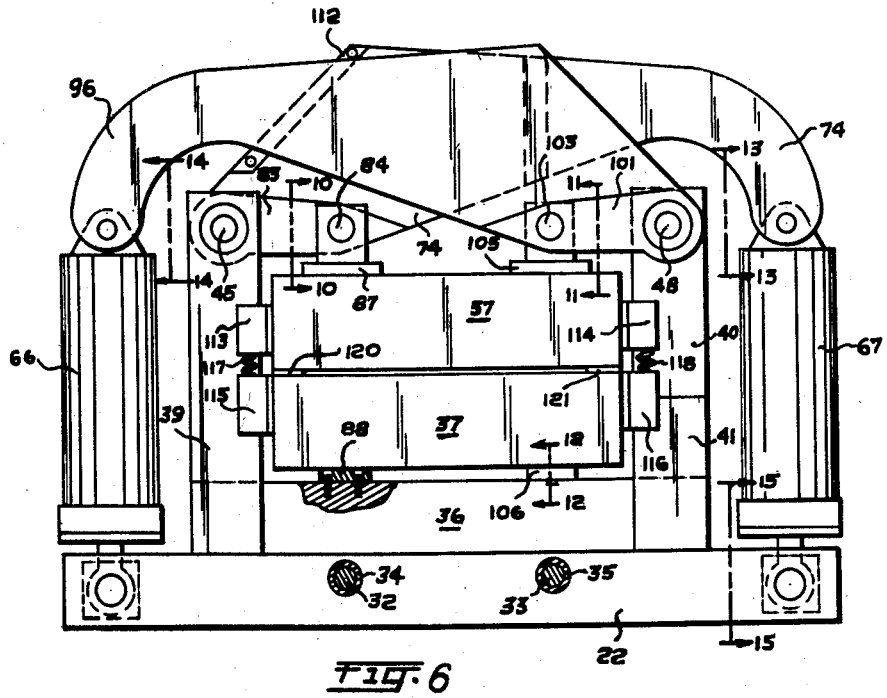
FIG. 6 is an end view of the press of FIG. 4 with parts in section.
FIG. 8 is a detail view in section of the press platens taken on line 8—8 of FIG. 4.
Figure 12:
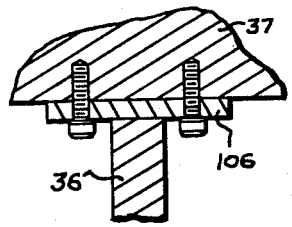
Figure 13:
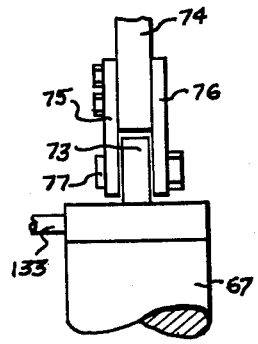
Figure 14:
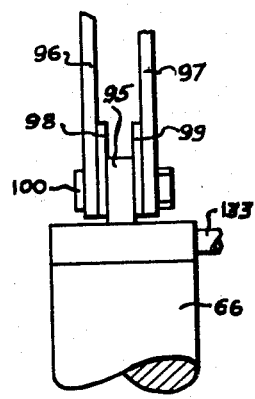
Figure 15:
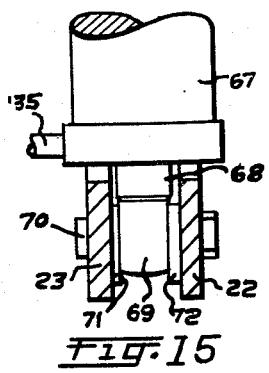

FIG. 10 is a view taken on line 10—10 of FIG. 6.
FIG. 11 is a view taken on line 11—11 of FIG. 6.
FIG. 12 is a view taken on line 12—12 of FIG. 6.
FIG. 13 is a view taken on line 13—13 of FIG. 6.
FIG. 14 is a view taken on line 14—14 of FIG. 6.
FIG. 15 is a view taken on line 15—15 of FIG. 6.
FIG. 16 is a side elevation view of the lateral support member taken from one side of the press and,
FIG. 17 is a side elevation view of the lateral support member taken from the other side of the press.

According to our invention the hollow passageway panel is confined between press platens which are then mechanically prestressed with the pressure being applied at selected points corresponding to points at which such platens would normally undergo significant deflection. Thereafter, inflating pressure is applied to the panel while simultaneously holding an inflation-resisting pressure upon the press platens. In accordance with this practice, it is found that the finished panel product is held within acceptable tolerances even though the press in which it was confined is much lighter, much simpler, and much less expensive than presses previously used for this work.

Figure 1:
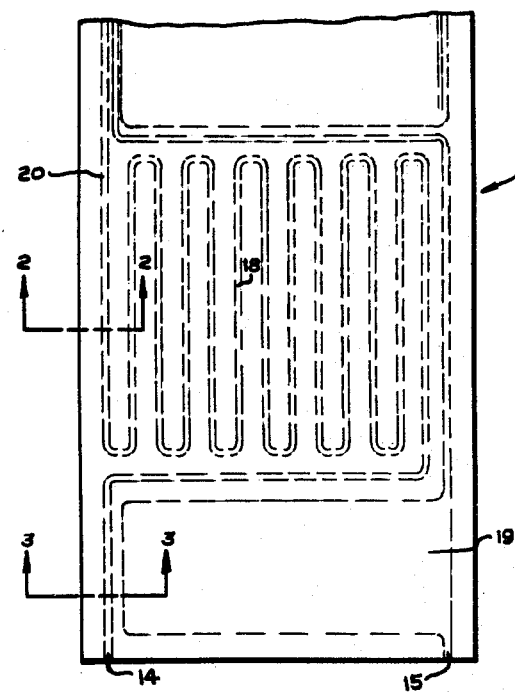
FIG. 1 is a plan view of a portion of a representative type of panel suitable for fabrication in accordance with the invention.
Figure 2:
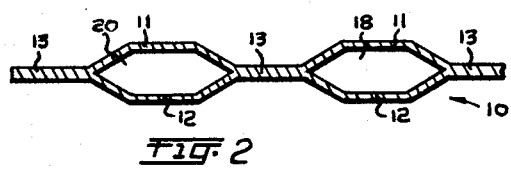
FIG. 2 is a sectional view taken on line 2—2 of FIG. 1 and to a larger scale.
Figure 3:
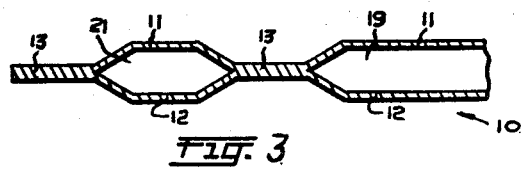
FIG. 3 is a sectional view taken on line 3—3 of FIG. 1 and to a larger scale.

Considering first the panel 10 as shown in FIGS. 1 to 3, the invention, however, being in no way limited to any particular form of panel, it will be seen that the panel is of a generally rectangular shape. It may, for example, comprise a composite flat sheet of aluminum having two originally separate laminations 11 and 12 bonded together in certain regions 13 defining the boundaries of the passageway. This passageway has an unbonded entranceway 14 and an unbonded outlet 15 into which expansion nozzles 16 and 17 (FIG. 7) may be inserted. Depending upon the use to which the panel is to be put, the passageway may include loops 18, large accumulator sections 19, straight runs 20 and the like. In any event, the application of the high pressure inflating fluid to the unbonded portions of the panel causes a non-uniform distribution of pressure across the surface of the confining press platen and would normally result in significant deflection of that platen in certain areas as the panel is inflated. It will be understood that as the inflating fluid is applied, the panel portions 11 and 12 stretch and form passageway openings such as shown at 18 and 21. This stretching of the panel portions may take place on only one side, or on both sides, depending upon the nature of the platens used. For purposes of disclosure, the well-known two-side expansion is illustrated herein, although our invention is in no way limited thereto.

Figure 4:
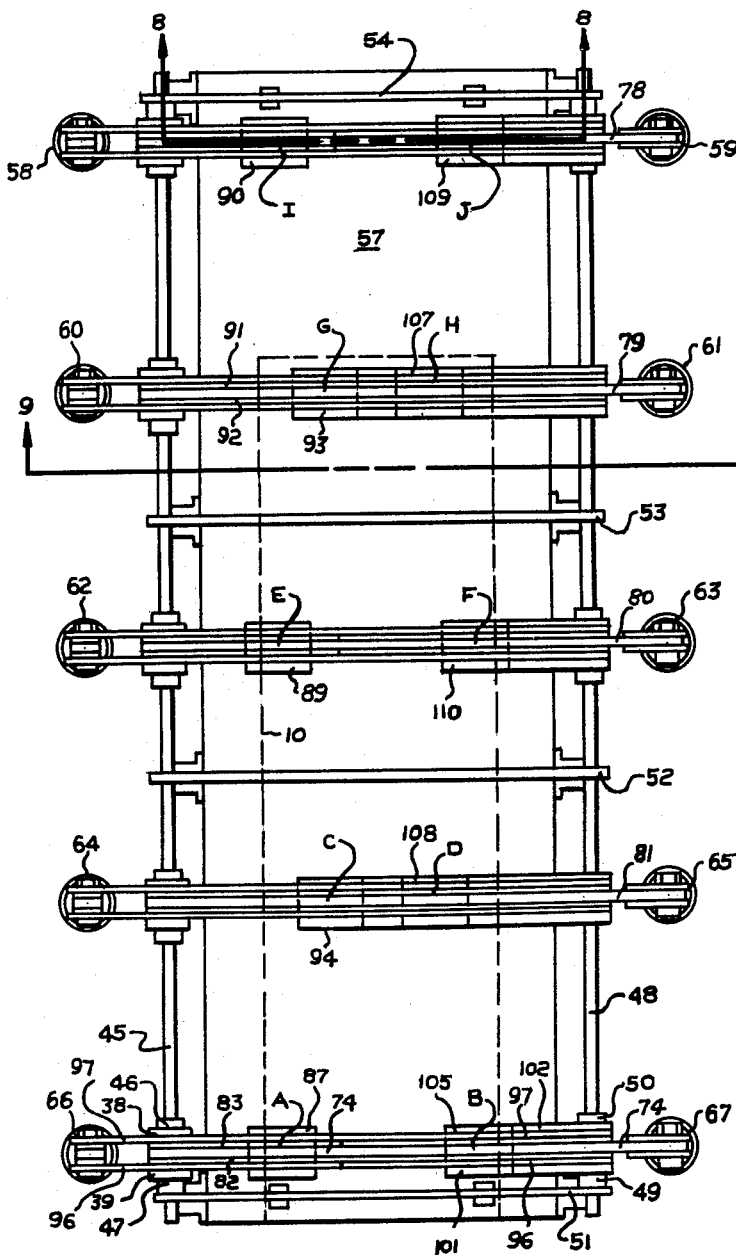
FIG. 4 is a plan view of a preferred form of the inflation press.
Figure 5:
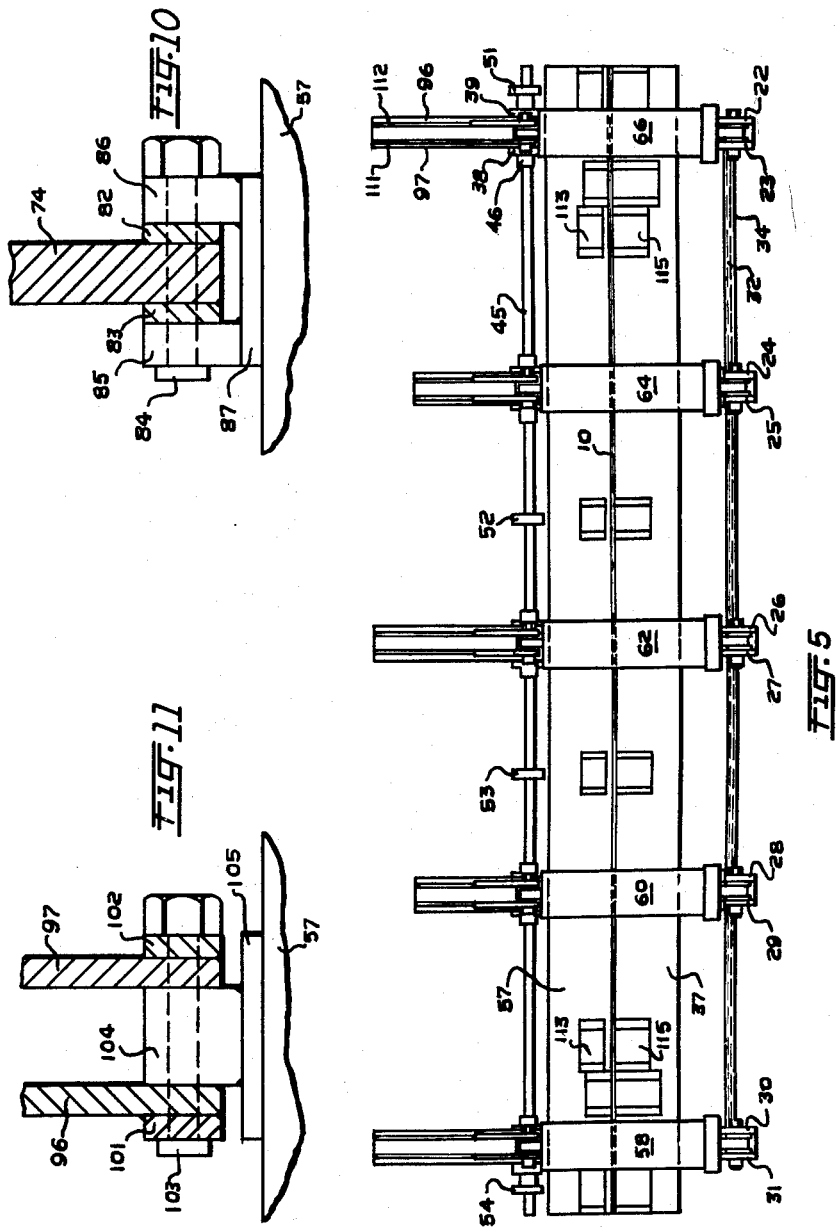
FIG. 5 is a side elevation view of the press of FIG. 4.

Referring now to FIGS. 4, 5, and 6, our improved inflation press includes a framework having a number of pairs of elongated base plate members, here shown as five pairs at 22, 23; 24, 25; 26, 27; 28, 29 and 30, 31. These plate members preferably are mounted on edge and serve as part of the base for the press and may in turn be mounted upon any suitable foundation. They are, in addition, held at a suitable spacing by means of elongated lower tie rods 32 and 33 affixed to the outermost of the plates and surrounded by suitable spacer tubes intermediate the plates, two such tubes being indicated at 34 and 35. Adjacent their extreme ends these plates provide a mounting for a pivotal piston rod in movable double acting hydraulic cylinder motors later to be described.

Suitably positioned between the plates of each pair of base members and preferably rigidly attached thereto is a press base beam, one of which is shown at 36 (FIG. 6). These beams which are shorter in length but greater in depth than the base plate members jointly serve to support the lower platen 37 of the press as well as to provide a rigid support for upstanding lateral members at the upper ends of which the press leverage arms are pivotally mounted. As best seen in FIG. 16, on one side of the press a pair of these lateral support members 38 and 39 are rigidly attached to their lower ends to one end of beam 36. As seen in FIG. 17 at the other side of the press a single lateral support member 40 is rigidly attached at its lower end to the other end of beam 36 as by a pair of splice plates 41 and 42.

Extending through each of the lateral support members 38 and 39 adjacent the upper ends thereof is an elongated relatively large and strong rod 45 serving both as a rocker arm shaft for certain of the press leverage arms and as a spacer for the adjacent support members of different pairs of such members, appropriate collars 46 and 47 fastened to the shaft serving to effect such spacing.

Similarly extending through each of the lateral support members 40 adjacent the upper ends thereof is an elongated relatively large and strong rod 48 serving both as a rocker arm shaft for others of the press leverage arms and as a spacer for the adjacent ones of such support members, appropriate collars 49 and 50 fastened to the shaft serving to effect such spacing. Completing the framework and giving additional rigidity thereto is a series of horizontal tie plates encompassing each of the rocker arm shafts and best shown at 51, 52, 53, and 54, in FIG. 4.

Housed within the above described framework for cooperation with lower platen 37 is a movable upper floating platen 57. These platens preferably have confronting surfaces of equal size and which is greater than the surface of the panel confined thereby so that the boundaries of the panel, except at the end having the panel passage inlet 14 and outlet 15, may lie well inboard of the edges of those platens.

Considering now FIG. 4, we have found that when fabricating panels of the type exemplified by panel 10, the upper platen normally tends to deform to a significant extent in certain regions inboard of its outer edges and that when pressure reinforcement is supplied in the regions indicated generally at A, B, C, D, E, F, G, H, I and J, such deformation is substantially eliminated and that the several objectives of the invention may be readily accomplished. At the same time, complementary support is provided for the lower platen in the regions immediately under the thus indicated upper platen regions as will later appear. By means of the invention, this pressure reinforcement feature is conveniently coordinated with the means for actuating the upper platen in the manner now to be described.

As noted for FIG. 4, a row of similar, double-acting, expansible chamber motors to which pressure fluid may be controllably supplied, is mounted outboard of the above described press framework and adjacent opposite sides thereof. The same number of motors is employed in each row and these may comprise cylinders indicated at 58, 59, 60, 61, 62, 63, 64, 65, 66 and 67 mounted for pivoted and axial movement. Within these cylinders, pistons having piston rods rigidly connected thereto and pivoted at the end externally of such cylinders, are disposed. A conventional packing gland surrounds the piston rod at the lower end of the closed reciprocable chamber. As best seen in FIG. 15, one of these piston rods 68 below the packing gland (not shown) may have a bearing 69 rotatably engaging a stationary pin 70 affixed between the outer edges of the stationary base plates 22 and 23. Suitable shims 71 and 72 may also be interposed between the sides of the bearing and the surfaces of the base plates to eliminate endwise shifting in the assembly.

Referring now to FIG. 13, at its upper end the cylinder 67 is provided with an apertured projection 73 rigid with the end of the cylinder. Extending into close proximity to this projection is one end of a pressure arm or lever 74 forming a significant part of the invention and which pressure arm 74 is pivotally mounted at its other end upon the rocker shaft 45 at the opposite side of the press. Rigidly mounted upon the arm 74 adjacent the end thereof, is a pair of side members 75 and 76 forming a clevis mount and with which a pin 77 extending through the projection 73 of the cylinder cooperates to couple the cylinder and arm in a clevis mounting. Each of cylinders 59, 61, 63 and 65, on the same side of the press as cylinder 67, are similarly connected to similar pressure arms 78, 79, 80 and 81 respectively as best seen in FIG. 4.

Each of the described pressure arms acts as a lever for the purpose of applying pressure to the uppermost platen 57 and for carrying out this purpose we prefer to employ a construction as now to be described. Since a distribution of pressure is desired at different areas inboard of the edges of the platens the several pressure arms are constructed for different effective leverages although the length of each arm and the prestressing pressures exerted thereon by the several pressure cylinders preferably are the same. When it is desired to apply a multiplied effective leverage to the platen in areas relatively close to the edges of the platen, we may use an arrangement as best seen in FIGS. 6 and 10. Rigidly fastened to the sides of the main pressure arm 74 as by welding and adjacent its pivot point upon rocker shaft 45 are two flat reinforcing plates 82 and 83 which are relatively short as compared with the total length of that pressure arm. These plates as well as the arm itself are provided with apertures through which a short and massive clevis pin 84 extends. This pin in turn passes through spaced shoulders 85 and 86 upstanding from a pressure-applying pad 87, preferably of square planar configuration. The bottom surface of this pad conforms to the upper surface of the upper platen 57, but is not affixed thereto. It will be noted that pad 87 applies pressure to the upper platen in the area A where that platen would normally be expected to deflect substantially during inflation of the panel. Moreover, since arms 82 and 83 are shorter than the distance between the lever fulcrum at shaft 45 and the point at which the force is applied by the cylinder, that force accordingly is multiplied by the inverse ratio of those distances. As will further be noted, immediately below the pad 87 the lower platen 37 rests upon a stationary pad 88 affixed to one of the press base beams 36. In this way both the upper and lower platens receive clamping pressure, in an area of normal deflection, from the pressure arm 74 when the platens are brought into contact as will later be explained.

Figure 9:
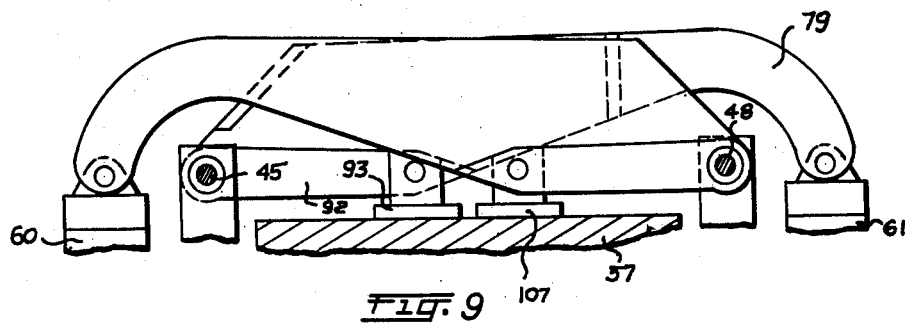
FIG. 9 is a detail view showing the arrangement of the pressure applying arm taken generally along line 9—9 of FIG. 4.

Each of arms 80 and 78 are provided with a similar construction including pressure-applying pads 89 and 90 acting in regions E and I. However, to permit the application of reinforcing pressure to the platens at optimum points, which may lie further inboard of the edges, it is desirable to have alternate ones of the pressure-applying pads staggered. Thus, pressure arms 81 and 79, as may be seen in FIGS. 4 and 9, are equipped with longer reinforcing plates 91 and 92 mounted as above described and acting to apply a clamping force to pressure-applying pads 94 and 93 in the regions C and G.

Referring now to FIG. 14, at its upper end the cylinder 66 is provided with an apertured projection 95 rigid with the end of the cylinder. Extending into close proximity to the sides of this projection is a pair of pressure arms 96 and 97 which are pivotally connected at their other ends upon the rocker shaft 48 at the opposite side of the press. Rigidly mounted upon this pair of arms as by welding and adjacent the cylinder, is a pair of reinforcing members 98 and 99 having apertures therein. Through these apertures and the aperture of projection 95 a pin 100 extends, thus connecting the cylinder to the ends of the pressure arms. Each of the cylinders 58, 60, 62, 64 are similarly connected to a similar pair of pressure arms, all of which are journalled for pivoted movement about the rocker shaft 48. Moreover, each of these cylinders contains piston rods pivotally mounted in the outer ends of the base plate members as described with respect to cylinder 67 in FIG. 15.

As seen in FIGS. 6 and 11, a flat reinforcing plate 101 is affixed to the outside of pressure arm 96 and a similar plate 102 is affixed to the outside of arm 97 adjacent the pivot points of those arms upon shaft 48. These plates, as well as the arms themselves, are provided with apertures through which a short and massive clevis pin 103 extends. This pin in turn passes through a centrally disposed projection 104 upstanding from a pressure-applying pad 105 of the type previously described. Pad 105 is adapted to apply pressure to the upper platen in the region of normal deflection at B. As will be seen, the same force multiplying effect of the leverage is available at pad 105 as previously described with respect to pad 87. Also as seen in FIG. 12, the lower platen 37 directly beneath pad 105, may rest upon a stationary pad 106 which bears against the press base 36 and is affixed to the lower platen.

With respect to the pairs of pressure applying arms connected to cylinders 60 and 64, however, longer reinforcing plates are provided thus to bring the respective pressure-applying pads 107 and 108 to bear at the regions H and D. Pads 109 and 110 are of similar disposition to pad 105 and bear upon the platen in the regions J and F.

In cooperation with the previously described rigid press framework the pairs of pressure-applying arms extending transversely of the frame closely encompass the single pressure-applying arm extending transversely of that frame from the other side. To maintain this rigidity in view of the high stresses imposed on the various press components and to minimize friction, we prefer to equip the single pressure applying arm, as seen in FIG. 16 with spacers 111 and 112 at each side and extending into sliding contact with the inner surfaces of the pair of cooperating arms. These spacers preferably are of brass or other suitable metal which is strong but which will give good slippage with respect to the arms in contact therewith. Other spacers of the same type may be located upon the same single arm closer to rock shaft 48, when desired. This interleaving of the several pressure-applying arms in each group of cooperating cylinders further assists in causing those cylinders to reciprocate in their established plane. Each leverage arm, as will be noted from FIGS. 6 and 9, has an arcuate portion which reaches over the rock shaft nearest the cylinder for that arm and has its deepest sections between the pivot of the arm and the pivot of the pressure-applying pad attached to the arm. In general, we prefer to have each arm of uniform width throughout its length although this is not essential.

Referring now to FIGS. 6 and 8 showing the platen arrangement, we employ a series of upper brackets 113 and 114 rigidly attached to the sides of the floating platen 57 and a series of lower brackets 115–116 rigidly attached to the sides of the fixed platen 37 and with heavy duty compression springs 117 and 118 between the cooperating brackets. While these springs are capable of lifting the weight of the upper platen and of the arm superstructure resting thereon when fluid pressure is relieved from one end of all of the cylinders, as later to be disclosed, an important purpose, however, is to provide a cushioned closing of the platens upon each other. Disposed longitudinally of the lower platen 37 along the side edges thereof are rigid bottoming blocks 120 and 121 against which the upper platen bottoms before prestressing in accordance with our improved method of operation. Suitable guide means may be used for register of the upper platen as it moves toward these bottoming blocks. Thus when the upper platen is moved into bottoming position against the action of the compression springs and before enhanced fluid pressure is applied by the several pressure motors, the upper platen is cradled in proper position with the several pressure-applying pads in loose contact with its upper surface in the regions where deflection would normally be expected. Also by suitable choice of the size of bottoming blocks 120 and 121 a space between these platen surfaces for receiving the uninflated panel 10 is present.

Referring now to the schematic showing of FIG. 7, one suitable arrangement for supplying pressure fluid to the described apparatus for carrying out the method, is shown. It will be understood that the invention is in no way limited to the precise system as shown and that different valving arrangements, pressure regulators and indicators, safety devices, and the like may be incorporated therein whenever desired. In general, for the actuation of the press we provide a reservoir 125 containing a substantially incompressible liquid such as oil or water and from which a heavy duty pump 126 driven by a motor 127 draws the liquid through conduit 128. This liquid is delivered under high pressure into conduit 129 containing a conventional heavy-duty four-way valve 130 the setting of which is suitably controlled by any convenient means at the disposal of the press operator.

From valve 130, a drain conduit 131 leads into the reservoir; an alternate supply and return conduit 132 leads to a manifold 133 connected to similar ends of each of the cylinders of the pressure motors; and an alternate supply and return conduit 134 leads to a manifold 135 connected to the similar other ends of each of the cylinders of those motors. Thus when valve 130 is at one setting, fluid is supplied to the bottoms of each cylinder simultaneously, thus causing all cylinders to move downward and to pivot the leverage arms attached thereto and to cause the pressure-applying pads on those arms to apply pressure to the floating upper platen. At this same time fluid is being vented from the manifold 133 through the valve 130 and into drain conduit 131. Likewise when the valve occupies its other setting, fluid is supplied to the tops of each cylinder simultaneously, thus causing the cylinders to move upwardly relieving the pressure upon the upper platen and allowing it to rise under the action of the compression springs thus permitting access to the space between the platens. At this same time fluid is being vented from the manifold 135 through the valve and into the drain conduit.

While the system for applying inflating pressure to the panel may if desired be combined with the system for operating the press thus to save duplication of motors, pumps and the like, we have shown for simplicity, a separate reservoir 140 containing a substantially incompressible liquid and from which a heavy-duty pump 141 driven by a motor 142 draws the liquid through conduit 143. This pump discharges into a conduit 144 equipped with a valve 145 and connected at its end to a nozzle 16 adapted to be inserted in fluid tight relation to the unbounded passageway inlet to the panel. The unbonded outlet passageway of the panel likewise may be connected in fluid tight relation with a nozzle 17 in return conduit 146 controlled by valve 147.

With the foregoing description in mind, the improved process of our invention may now be followed.

As known to those skilled in the art, the passageway panel structures may rupture at portions where two convolutions join or cross each other, may expand or stretch at different rates and to different extents, may result in distorted panels and may undergo various other disadvantageous changes, unless the inflation steps are conducted under exacting controls. Many of these problems are solved during the practice of our process wherein prestressing of the press apparatus in certain critical regions is made possible. In carrying out our process, we first position the panel 10 between the platens, the floating platen being sufficiently retracted and the several cylinders of the pressure motors being at their uppermost path of travel. The nozzles 16 and 17 may conveniently be inserted into the inlet 14 and outlet 15 of the panel at this time, or may be inserted after the press closes, as desired. Valve 130 is then turned to apply pressure at the lower ends of the several cylinders through manifold 135. As this pressure is built up, each of the cylinders moves downwardly simultaneously pulling with them the pressure applying levers or arms. At the same time the several pressure-applying pads in contact with the upper face of the floating upper platen move that platen downward. The upper platen moves downward until it contacts the bottoming plates 120 and 121 and at this time the space between the platen surfaces is exactly the thickness dimension which the inflated passageways of the inflated article will later acquire. An important feature of our process now becomes evident for when the upper platen bottoms upon these blocks, the several cylinders have not reached their lowermost path of travel, nor has the pressure applied thereto by pump 126 reached its maximum value. On the contrary, the pump forces a small additional quantity of liquid into manifold 135 and the cylinders move downward a small but exceedingly significant additional distance after the platens have bottomed.

As this occurs, each of the pressure-applying leverage arms undergoes a prestressing action and transmits this prestress with a multiplied leverage to its pressure-applying pad. This pad in turn acts against the upper platen and tends to deflect it downward in the regions where that platen is later to receive its maximum stress as the article is inflated. As this occurs, the pressure of the upper platen through the bottoming blocks is being applied to the lower platen and since the lower platen is supportd upon stationary pads immediately below the pads pushing upon the upper platen, that lower platen also is prestressed and tends to deflect upwardly. It will be understood that during this described prestressing step the article 10 is loosely confined between the prestressed platens.

Upon developing the desired prestressing in the platens, pump 130 merely holds the attained pressure within the lower ends of the several cylinders, the upper ends of those cylinders now being vented into drain 131.

By suitable manipulation of valves 145 and 147, pressure fluid from pump 141 is now supplied into the inflatable article 10. As this pressure builds up the unbonded passageways expand and stretch in the known manner until the lamination 11 settles against the surface of the upper platen while the lamination 12 settles against the lower platen. This action entails the application of progressively higher pressures from pump 141 until the article is properly inflated and such pressures reach a maximum substantially higher than the pressure found in manifold 135. As above described, the pattern of bonded and unbonded regions in the panel require a non-uniform resisting pressure from the confining platens and by means of our invention the regions in the panel at which the panel requires the greatest resisting force correspond generally to those regions in which the platens have been prestressed as above defined. Thus when the panel is fully inflated, the platens are able to present thereto a non-deflected surface which assures a finished panel having proper tolerances and with much less likelihood of ruptured or bent panels as contrasted with presently used processes and equipment. Of particular economic importance this desirable result is achieved by use of a press which is not overly massive and which does not require a built-in capacity capable of resisting deformation at all points on the platen surfaces.

After the panel is inflated, the valves 145 and 147 are manipulated to drain the panel and simultaneously pressure is relieved from manifold 135, valve 130 being turned to drain that manifold. Thereafter, fluid is admitted to manifold 133 and the several cylinders simultaneously rise carrying the pressure applying arms therewith. As these arms rise, their pads release pressure upon the upper platen and under the influence of the several compression springs, this floating platen itself rises. When it reaches its upper limit of movement the inflated article is removed and a non-inflated article may then be positioned in the press for the next cycle.

Due to the rigidity of the press framework and the interleaving and spacing of the several pressure-applying levers, the repeated prestressing of the apparatus does not result in permanent set of the equipment. Moreover, the angle of pivoting of the cylinders is relatively small since the use of elongated lever arms (which are needed for effective multiplication of prestressing forces without excessively high pressures in the manifold 135) together with the relatively small space between the platens needed for this type of article all contribute to reduction of the problem of sealing the gland around the piston rods. These and other practical advantages of the invention will, of course, be readily apparent to those skilled in the art.

While present preferred embodiments of the invention have been illustrated and described, it will be understood that the invention may be otherwise variously embodied and practiced within the scope of the following claims.

What is claimed is:

1. A metal-forming press comprising, a rigid press framework, a stationary platen mounted upon said framework, a floating movable platen disposed within said framework, a pair of elongated shafts mounted upon said framework longitudinally thereof and along opposite sides of said platens, a plurality of first levers spaced along the longitudinal axis of said press and each having a portion intermediate its ends in contact with said floating platen, said first levers each being mounted for pivotal movement about one of said shafts, a plurality of first expansible chamber motors each having a movable portion attached to one of said first levers, a plurality of second levers spaced along the longitudinal axis of said press and each having a portion intermediate its ends in contact with said floating platen, said second levers each being mounted for pivotal movement about the other of said shafts, a plurality of second expansible chamber motors each having a movable portion attached to one of said second levers, and means for controllably supplying pressure fluid simultaneously to each of said motors thereby to move said floating platen toward said stationary platen and to form a space therebetween within which said article may be controllably inflated, said space having a maximum thickness dimension determined in dependence upon the undeflected confronting surfaces of said platens at the conclusion of the inflation of said article.

2. A press as defined in claim 1 wherein at least one of said second levers comprises spaced lever arms between which one of said first levers is mounted.

3. A press as defined in claim 1 wherein said intermediate portions of said levers include pressure-applying pads releasably engaging said floating platen.

4. A press as defined in claim 1 including a base member providing spaced support means for said stationary platen substantially directly beneath the respective areas of contact of said intermediate portion of said levers with said floating platen.

5. A metal-forming press comprising, a rigid press framework, a stationary platen mounted upon said framework, a floating movable platen disposed within said framework, resilient means normally holding the confronting surfaces of said platens sufficiently far apart to receive there-between an inflatable metal article, a pair of elongated shafts mounted upon said framework longitudinally thereof and along opposite sides of said platens, a plurality of first levers spaced along the longitudinal axis of said press and each having a portion intermediate its ends in contact with said floating platen, said first levers each being mounted adjacent one end for pivotal movement about one of said shafts, a plurality of first expansible chamber motors each having a movable portion attached to one of said first levers adjacent the other end thereof, a plurality of second levers spaced along the longitudinal axis of said press and each having a portion intermediate its ends in contact with said floating platen, said second levers each being mounted adjacent one end for pivotal movement about the other of said shafts, a plurality of second expansible chamber motors each having a movable portion attached to one of said second levers adjacent the other end thereof, a bottoming block interposed between the confroning surfaces of said platens, and means for controllably supplying pressure fluid simultaneously to each of said motors thereby to move said floating platen toward said stationary platen and to form a space therebetween within which said article may be controllably inflated, said space having a minimum thickness dimension determined in dependence upon said bottoming block and a maximum thickness dimension determined in dependence upon the undeflected confronting surfaces of said platens at the conclusion of the inflation of said article.

6. A press as defined in claim 5 wherein the portions of said first and second levers in contact with said floating platen each lie inboard of the edges of said platen.

7. A press as defined in claim 5 wherein the portions of said first and second levers in contact with said floating platen each lie inboard of the edges of said platen and at least one of said portions is operable to apply pressure nearer the longitudinal center line of said platen than is another of said portions.

8. A metal-forming press comprising, a rigid press framework, a stationary platen mounted upon said framework, a floating movable platen disposed within said framework, resilient means normally holding the confronting surface of said platens sufficiently far apart to receive therebetween an inflatable metal article, a pair of shafts mounted upon said framework along opposite sides of said platens, a first lever having a portion intermediate its ends in contact with said floating platen, said first lever being mounted adjacent one end for pivoted movement about one of said shafts and being reinforced in the region between said one end and said intermediate portion thereby to sustain a prestressing of said first lever, a first expansible chamber motor having a movable portion attached to said first lever adjacent the other end thereof, a second lever having a portion intermediate its ends in contact with said floating platen, said second lever being mounted adjacent one end for pivoted movement about the other of said shafts and being reinforced in the region between said one end and said intermediate portion of said second lever thereby to sustain a prestressing of said second lever, a second expansible chamber motor having a movable portion attached to said second lever adjacent the other end thereof, and means for controllably supplying pressure fluid simultaneously to said motors thereby to move said platens into contact with each other, said motors being arranged to continue to apply pressure to the lever attached thereto following contact of said platens whereby said reinforced levers may be prestressed prior to inflation of said article.

References Cited by the Examiner

UNITED STATES PATENTS

| 1,940,250 | 12/33 | Furrer | 113—45 |
| 2,105,053 | 1/38 | Patrick | 100—271 |
| 2,204,413 | 6/40 | Hubbert | 100—271 |
| 2,309,460 | 1/43 | Lester | 100—271 |
| 2,490,695 | 12/49 | Leutheuser | 113—44 |
| 2,545,570 | 3/51 | Caldwell | 113—44 |
| 2,558,071 | 6/51 | Castle et al. | 100—271 |
| 2,592,867 | 4/52 | Cuq | 113—44 |
| 2,857,658 | 10/58 | Luther | 113—44 |
| 2,892,254 | 6/59 | Gawin | 29—421 |

CHARLES W. LANHAM, *Primary Examiner.*